United States Patent
Dharwadker et al.

(10) Patent No.: US 10,846,614 B2
(45) Date of Patent: Nov. 24, 2020

(54) EMBEDDINGS FOR FEED AND PAGES

(71) Applicant: Facebook, Inc., Menlo Park, CA (US)

(72) Inventors: Amey Ajit Porobo Dharwadker, London (GB); Sanjeet Uday Hajarnis, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 838 days.

(21) Appl. No.: 15/460,716

(22) Filed: Mar. 16, 2017

(65) Prior Publication Data
US 2018/0268317 A1  Sep. 20, 2018

(51) Int. Cl.
*G06N 20/00* (2019.01)
*G06F 16/9535* (2019.01)
*G06F 16/33* (2019.01)
*G06Q 50/00* (2012.01)
*G06K 9/62* (2006.01)
*G06K 9/00* (2006.01)
*G06N 5/04* (2006.01)

(52) U.S. Cl.
CPC ......... *G06N 20/00* (2019.01); *G06F 16/3347* (2019.01); *G06F 16/9535* (2019.01); *G06K 9/00677* (2013.01); *G06K 9/6215* (2013.01); *G06K 9/6267* (2013.01); *G06Q 50/01* (2013.01); *G06N 5/04* (2013.01)

(58) Field of Classification Search
CPC . G06F 16/3347; G06F 16/9535; G06Q 50/01; G06N 20/00; G06N 20/10; G06N 20/20; G06N 5/04; G06K 9/6267; G06K 9/00677; G06K 9/6215
USPC .......................................................... 706/12
See application file for complete search history.

(56) References Cited

U.S. PATENT DOCUMENTS

| | | | |
|---|---|---|---|
| 2012/0215903 A1* | 8/2012 | Fleischman | G06Q 50/01 709/224 |
| 2015/0254566 A1* | 9/2015 | Chandramouli | G06N 5/04 706/11 |
| 2015/0373281 A1* | 12/2015 | White | G06F 16/435 348/660 |
| 2017/0139920 A1* | 5/2017 | Ball | H04L 51/32 |
| 2018/0150785 A1* | 5/2018 | Wang | G06N 7/005 |
| 2018/0193674 A1* | 7/2018 | Brooks | G16H 30/40 |

* cited by examiner

*Primary Examiner* — Shane D Woolwine
(74) *Attorney, Agent, or Firm* — Fenwick & West LLP

(57) ABSTRACT

An embedding vector is the determined for a target user based on a weighted sum or the embedding vectors of entities the target user has interacted with in the past. Then, for each entity of a plurality of entities of the online system, a measure of similarity between the embedding vector of the user and the embedding vectors of the plurality of entities is determined. Based on the measure of similarity of each of the entities, the plurality of entities are ranked and one or more entities are selected to be presented to the user.

20 Claims, 3 Drawing Sheets

EMBEDDINGS FOR FEED AND PAGES

BACKGROUND

This disclosure relates generally to selecting content recommendations to users of an online system, and more specifically to determining feature vectors for entities in an online system using entity co-engagement.

Some online systems, such as a social networking system, provides content items to users based on models that attempt to score or rank the content available in the online system based on a likelihood that a user will be interested in the content item. In large online systems, the amount of content available can be very large. In this scenario, processing all or a large portion of the content available to be presented to the user may be unfeasible by the online system. For instance, processing all or a large portion of the content available to be presented to the user may take too much time or too many computing resources. As such, content items that the user might be interested in might be overlooked because the online system does not have enough resources to score or rank those content items.

SUMMARY

To select the content to be presented to the user, a model to generate embedding vectors is trained based on entity co-engagement. The model may be trained such that entities that have engaged by the same set of users have embedding vectors that are closer to each other in the vector space. Using the trained model, embedding vectors for entities of the online system can be generated. An embedding vector is the determined for a target user based on a weighted sum of the embedding vectors of entities the target user has interacted with in the past. Then, for each entity of a plurality of entities of the online system, a measure of similarity between the embedding vector of the user and the embedding vectors of the plurality of entities is determined. The measure of similarity may be based on a distance between the embedding vector of the user and the embedding vectors of the entities or the angle between the embedding vector of the user and the embedding vectors of the entities. For example, a cosine similarity between the user's embedding vector and each of the entity embedding vectors may be calculated to represent the similarity between the user and the entity.

Based on the measure of similarity, the entities are ranked and one or more entities are selected to be presented to the user. For instance, a top threshold number of entities (e.g., the top 20 entities) are selected to be presented to the user.

To determine an entity embedding quickly, for example before significant interaction has occurred with an entity, the entity's embedding may be determined based on other associated entities such as locations where the entity is presented or topics or other entities associated with the entity. For example, an entity embedding may be used to represent a newly posted content item, such as a video. The entity embedding for the new content item may be determined based on the page on which the video is posted, as well as topics associated with the video. The embeddings for these may be combined or averaged to determine the embedding for the content item. Thus, these newly-posted content items may 'inherit' or otherwise adopt the related page and topic embeddings, allowing the video to quickly be represented in the embedding space and a similarity score generated for the newly-posted content. Similarly, when new posts or other content for a page are added, the embedding for a page may be used to initially determine an embedding for the new content. Additionally, pages may be determined for recommendation to a user by determining the similarity score between a page interacted with by the user and another page.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
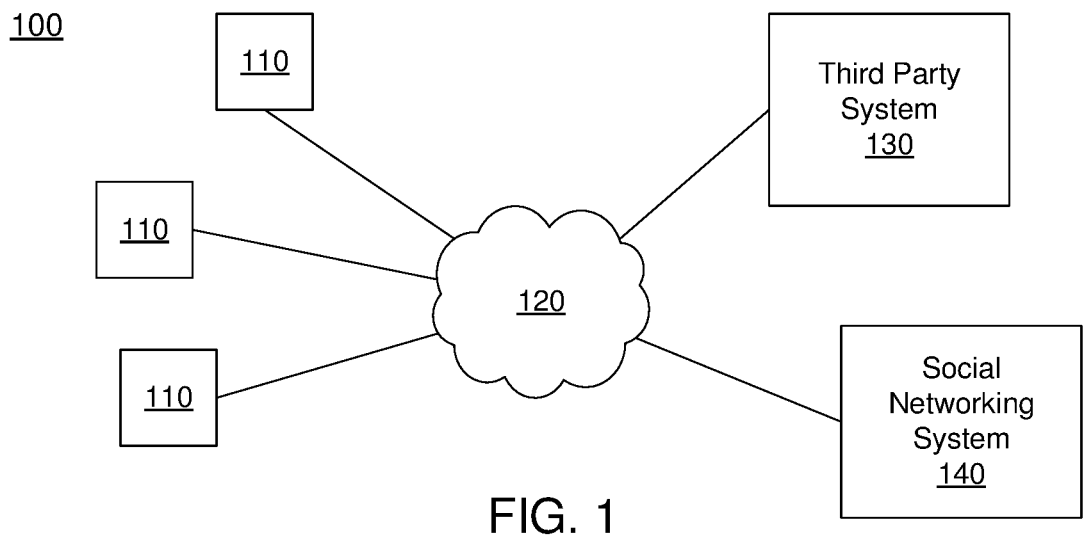
FIG. 1 is a block diagram of a system environment in which an online system operates, according to one embodiment.

FIG. 1 is a block diagram of a system environment 100 for an online system 140, according to one embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
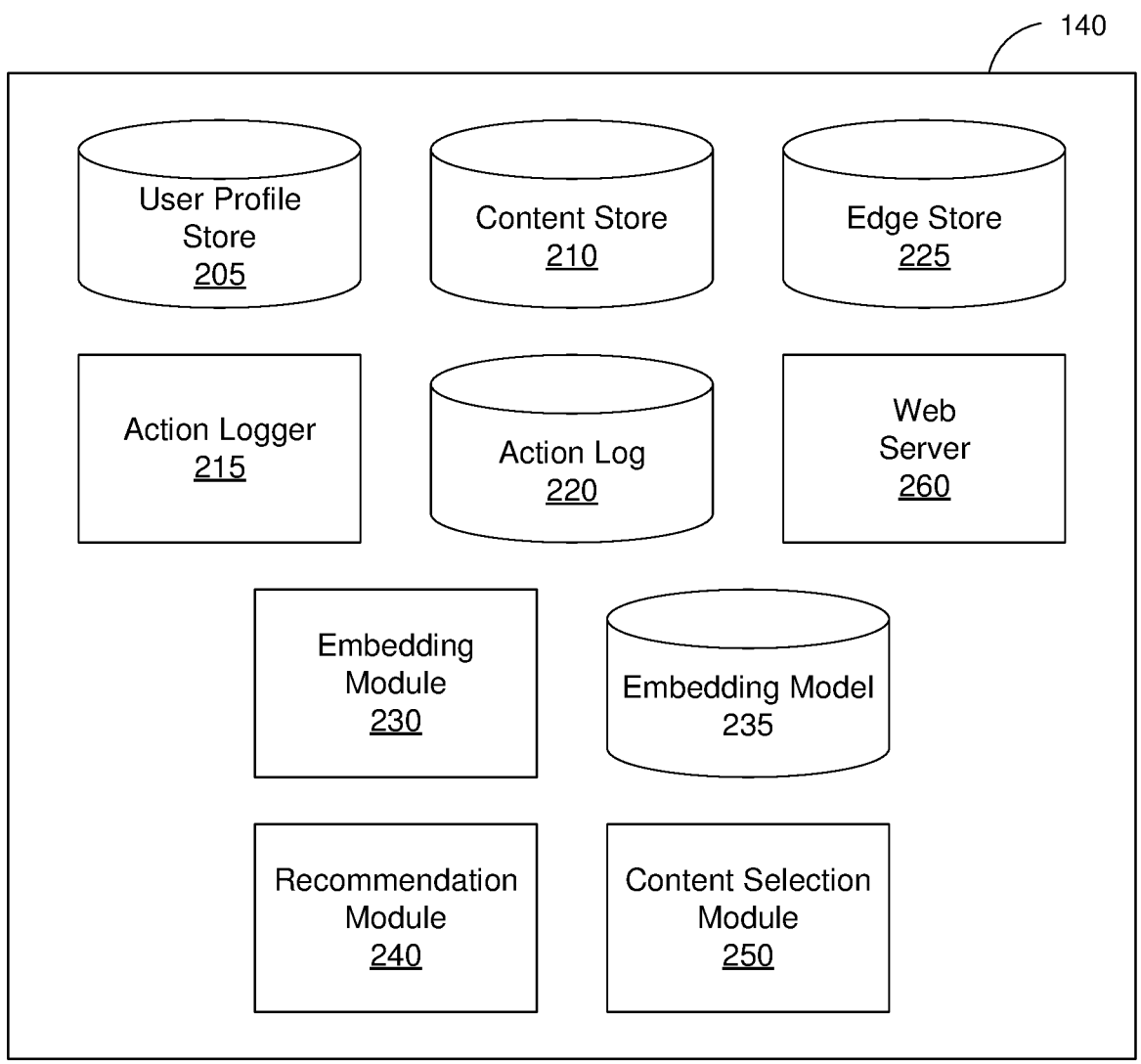
FIG. 2 is a block diagram of an online system, according to one embodiment.

FIG. 2 is a block diagram of an architecture of the online system 140, according to one embodiment. The online system 140 shown in FIG. 2 includes a user profile store 205, a content store 210, an action logger 215, an action log 220, an edge store 225, an embedding module 230, an embedding model 235, a recommendation module 240, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The embedding module 230 applies machine learning techniques to generate an embedding model 235 that includes embedding vectors for entities of the social networking system 140 that describes the entities in latent space. As used herein, latent space is a vector space where each dimension or axis of the vector space is a latent or inferred characteristic of the objects in the space. Latent characteristics are characteristics that are not observed, but are rather inferred through a mathematical model from other variables that can be observed.

The embedding model 235 is trained using a stochastic gradient descent algorithm based on entity co-engagement. That is, the embedding model 235 is trained so that the distance between the embedding vectors of different entities is proportional to the level of co-engagement of the entities. As used herein, co-engagement refers to two or more entities being engaged with by a same user. That is, a first entity and a second entity are said to be co-engaged if a user interacts with both the first and second entities. Furthermore, the level of co-engagement of two or more entities is proportional to the number of users that engaged with all of the two or more co-engaged entities.

Figure 3:
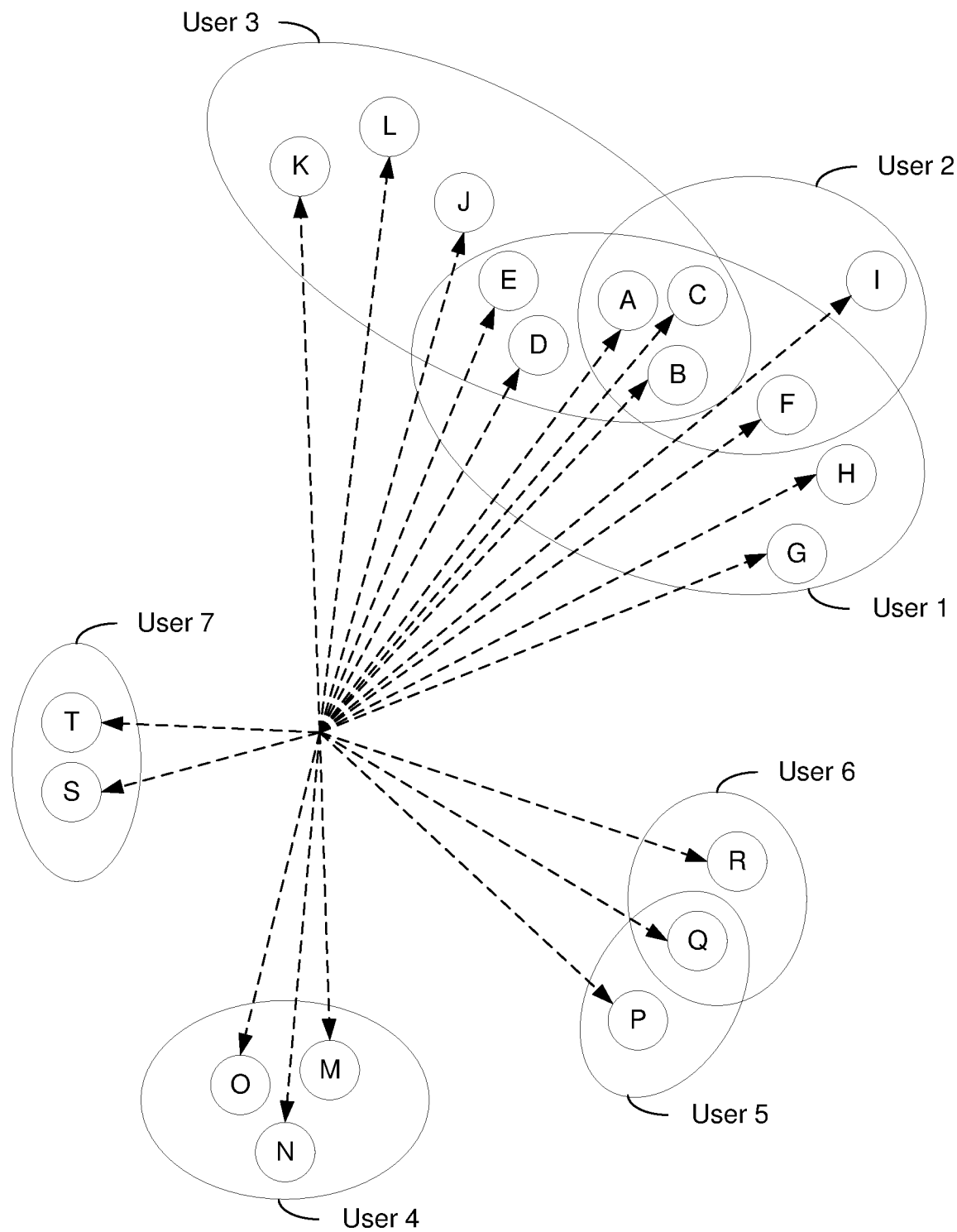
FIG. 3 illustrates an example of a two dimensional latent space where 20 entities (A through T) are represented, according to one embodiment.

FIG. 3 illustrates an example of a two dimensional latent space where 20 entities (A through T) are represented, according to one embodiment. In the example diagram of FIG. 3, user 1 has interacted with entities A through H; user 2 has interacted with entities A, B, C, F, and I; user 3 has interacted with entities E, D, J, K, and L; user 4 has interacted with entities M, N, and O; user 5 has interacted with entities P and Q, user 6 has interacted with entities Q and S; and user 7 has interacted with entities S and T. Since three users have co-engaged with entities A, B, and C, the embedding vectors of entities A, B, and C are close to each other in the latent space. Moreover, since entities A through H have a co-engagement by user 1, the embedding vectors of entities A through H are closer to each, while the embedding vectors of entities M through T are further away from the embedding vectors of entities A through H since none of entities M thorough T were engaged by a user that also engaged with any of entities A through H.

During the training of the embedding model 235, a user is represented as a bag of historically engaged entities. That is, the user is represented as a group of entities the user has previously interacted with. In some embodiments, the user is represented as the last N entities the user interacted with. In other embodiments, the user is represented as all the entities the user interacted with within a preset time period (e.g., within the past 3 months). In yet other embodiments, the user is represented a bag of randomly chosen historically engaged entities.

To generate a positive training sample, one entity of the representation of the user is picked out and the embedding vector of the picked entity is determined based on the other entities remaining in the representation of the user. The embedding model 235 is then updated based on the embedding vector of the positive training sample.

To generate a negative training sample, an entity the user has not engaged with is randomly chosen and the embedding model is applied to the randomly chosen entity. The embedding model 235 may then be updated based on the embedding vector of the negative training sample.

In some embodiments, the embedding model 235 is trained using a lock-free parallel stochastic gradient descent (SGD). Since inputs are sparse and high dimensional, the probability of collision of active weights is low. As such, multiple computing threads may be used in parallel to randomly obtain one training sample, and update the model based on the obtained training sample.

The recommendation module 240 identifies entities to users based on the embedding vectors determined for each of the entities in the social networking system. In some embodiments, the recommendation module 240 provides entity recommendations based on the similarity to entities the user has previously interacted with (entity-entity recommendations). To provide the entity-entity recommendations, the recommendation module 240 identifies entities based on the similarity or distance between the embedding vector of the entity and the embedding vector of the entities the user has previously interacted with. The recommendation module 240 may calculate a cosine similarity score between target entities the user has not previously interacted with and historical entities the user has previously interacted with. That is, the recommendation module 240 may calculate an inner product between the embedding vector of a target entity and the embedding vector of a historical entity. The cosine similarity scores for multiple entities are then ranked and the recommendation module may select the top ranked entities to be recommended to the user.

In other embodiments, the recommendation module 240 provides entity recommendations based on the distance between the embedding vector of entities and a user vector that is determined based on the embedding vectors of the entities the user has previously interacted with (user-entity recommendations). For instance, the user vector may be determined as:

$$\langle \text{user\_vector} \rangle = \frac{1}{N} \sum_{i=1}^{N} \alpha_i \langle \text{page}_i\text{\_vector} \rangle$$

Where $\alpha_i$ is a weight for the type of interaction the user had with the entity and <$\text{page}_i$ vector> is the embedding vector of a page. Types of interactions may include, watching a video associated with an entity, commenting on an entity, liking an entity, and sharing an entity. For instance pages that a user shared may have a greater weight than pages that the user liked but did not share. In some embodiments, the weight $\alpha_i$ may also account for a time decay based on how long ago the user interacted with the entity. That is, interactions that happened a longer time ago would have a smaller weight than interactions that happened more recently. To provide the user-entity recommendations, the recommendation module 240 may calculate a cosine similarity score between target entities the user has not previously interacted with and the user vector, rank the target entities based on the cosine similarity scores, and select the top rated ranked entities to be recommended to the user.

In yet other embodiments, the recommendation module 240 provides entity recommendations to a target user based the entities previously interacted by other users with user vectors that are close to the user vector of the target user (user-user recommendations). To provide the user-user recommendations, the recommendation module 240 determines cosine similarity scores between the user vector of multiple other users and the user vector of the target user. The recommendation module 240 then ranks the other users based on the cosine similarity scores and selects entities previously interacted by the top ranked users for being recommended to the target user.

Since the number of entities in a social networking system may be large, exhaustive search may not be realistically possible. Instead, the recommendation system may partition the search space based on predetermined rules and then may perform a more exhaustive search in one or more partitions.

Different types of entities that can be recommended to users include videos and pages. For providing video recommendations, the recommendation module 240 identifies video content providers that provide videos at a rate higher than a threshold value (e.g., one video per week). The recommendation module then determines an embedding vector for each of the identified video content providers and compares the embedding vectors of the identified video content providers to the embedding vector of the user. That is, the recommendation module 240 calculates a similarity score between (a) embedding vectors of the video content providers and (b) the embedding vector of the user. Based on the similarity score, one or more video content providers are selected, and one or more videos provided by the selected video content providers are selected for recommendation to the user.

For providing page recommendations, pages may be partitioned by the level of engagement users of the social networking system has shown for the page. For instance, a metric used to partition the pages is an amount of user engagement per amount of reach. Then, the recommendation module 240 may provide entity-entity recommendations or user-entity recommendations of pages with a level of engagement higher than a threshold value.

For instance, when a user engages with an entity, the recommendation module 240 searches for another entity that has an embedding vector that is close to the embedding vector of the engaged entity. In some embodiments, the recommendation module 240 calculates similarity scores between (a) embedding vectors of multiple entities with a level of engagement higher than the threshold value and (b) the embedding vector of the engaged entity, ranks the multiple entities based on the calculated score, and selects one or more entities for recommendation to the user.

The recommendation module may also provide "pages you may like" to a user by searching for an entity that has an embedding vector that is close to the embedding vector of the user. In some embodiments, the recommendation module 240 calculates similarity scores between (a) embedding vectors of multiple entities with a level of engagement higher than the threshold value and (b) the embedding vector of the user, ranks the multiple entities based on the calculated score, and selects one or more entities for recommendation to the user.

The web server 260 links the online system 140 via the network 120 to the one or more client devices 110, as well as to the one or more third party systems 130. The web server 260 serves web pages, as well as other content, such as JAVA®, FLASH®, XML, and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, or BlackberryOS.

Co-Engagement Based Feature Representation

Figure 4:
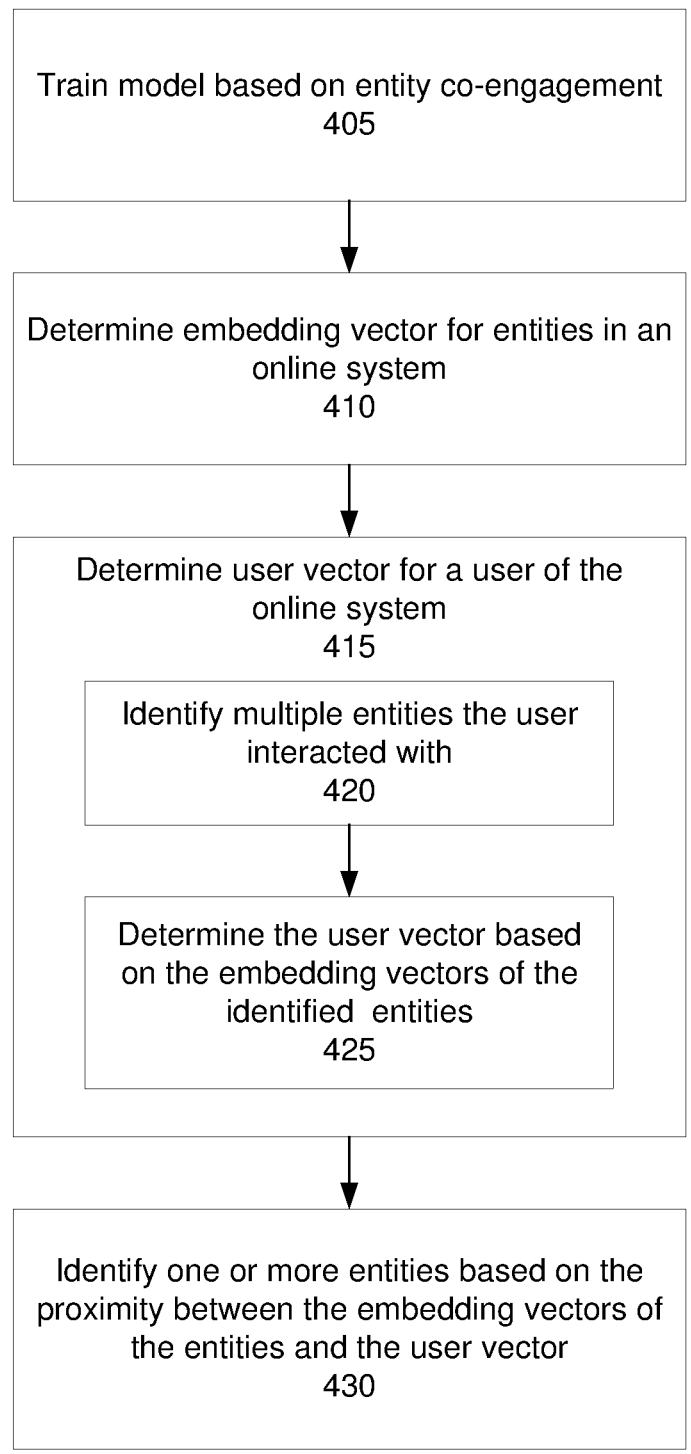
FIG. 4 is a flow diagram of a method for identifying entities to be recommended to a user of a social networking system, according to one embodiment.

FIG. 4 is a flow diagram of a method for identifying entities to be recommended to a user of a social networking system, according to one embodiment. The embedding module 230 trains 405 the embedding model 235 based on entity co-engagement in the social networking system. The embedding model 235 is trained so that the distance between vectors is related to the level of co-engagement of the entities.

The embedding module 230 determines 410, using the trained embedding model 235, embedding vectors for entities in the social networking system.

The recommendation module 240 determines 415 a user vector for a target user of the online system. To determine the user vector, the recommendation module 240 identifies 420 multiple entities the user interacted with in the past. The recommendation module 240 then determines 425 the user vector based on the embedding vectors of the identified entities. In some embodiments, the user vector is a weighted average of the embedding vectors of the identified entities.

The recommendation module 230 identifies 430 one or more entities based on the proximity between the embedding vectors of the entities of the social networking system and the determined user vector. The recommendation module 230 determines the distance between the user vector and the embedding vector of an entity based on a cosine similarity score between the user vector and the embedding vector.

In some embodiments, the recommendation module 240 filters the entities based on the Euclidean distance of user vector and the embedding vectors of the entities. For instance, the recommendation module 240 filters out entities whose embedding vector has a Euclidean distance that is not within a threshold value of the user vector. That is, for a user vector <user_vector>=<$u_1, u_2, u_3, \ldots, u_n$> and entities embedding vectors entity$_i$_vector>=<$e_{i_1}, e_{i_2}, e_{i_3}, \ldots, e_{i_n}$> the recommendation module filters out an entity i if:

$$\sqrt{(u_1 - e_{i_1})^2 + (u_2 - e_{i_2})^2 + (u_3 - e_{i_3})^2 + \ldots + (u_n - e_{i_n})^2} \geq k$$

where k is the threshold distance value in the latent space.

In other embodiments, the recommendation module 240 filters out entities with embedding vectors that are not in same orthant or hyperoctant as the user vector. As used herein, an orthant or a hyperoctant is the n-th dimensional analogue of a quadrant in a plane. As such, the recommendation module 240 may be able to discard entities w embedding vectors that are not within a threshold proximity of the user vector without having to determine the distance or the angle between each of the embedding vectors and the user vector.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    determining embedding vectors for a plurality of entities of a social networking system, the entities of the social networking system providing content for consumption by users of the social networking system, the embedding vectors representing the entities of the social networking system in a latent space and determined based on entity co-engagement by a set of users interacting with the plurality of entities, wherein a level of co-engagement of two or more entities is proportional to a number of users that engaged with the two or more entities in the past;
    determining a user vector for a target user of the social networking system, the user vector based on a weighted sum of embedding vectors of entities the target user interacted with in the past;
    for each entity of a set of entities of the social networking system, determining a measure of similarity between the user vector and an embedding vector of the entity;
    ranking the set of entities based on the determined measure of similarity; and
    selecting a top threshold number of entities to be presented to the target user based on the ranking.

2. The method of claim 1, wherein the measure of similarity is a cosine similarity score between the user vector and the embedding vectors.

3. The method of claim 1, wherein determining a measure of similarity between the user vector and an embedding vector of the entity comprises:
    determining a measure of similarity between the user vector and embedding vectors that are in a same orthant as the user vector.

4. The method of claim 1, wherein the measure of similarity between the user vector and an embedding vector of an entity is performed responsive to determining that the embedding vector of the entity is within a threshold Euclidean distance value of the user vector.

5. The method of claim 1, further comprising:
    identifying one or more entities to be presented to the user based on a measure of similarity between an embedding vector of an entity the target user has previously interacted with and embedding vectors of the entities of the set of entities of the social networking system.

6. The method of claim 1, further comprising responsive to the user interacting with a first entity:
    determining an embedding vector for the first entity;
    for each entity of the set of entities of the social networking system, determining a measure of similarity between the embedding vector of the first entity and an embedding vector of the entity;
    ranking the set of entities based on the determined measure of similarity; and
    selecting one or two entities to be presented to the target user based on the ranking.

7. The method of claim 1, wherein training the model based on entity co-engagement comprises:
    training the model so that a distance between embedding vectors for two entities of the social networking system is based on a level of co-engagement of the two entities.

8. The method of claim 1, further comprising:
    determining a level of engagement for each of the set of entities, the level of engagement directly proportional to an amount of engagement for an entity of the set of entities, and indirectly proportional to a number of users the entity was presented to; and
    filtering the set of entities based on the determined level of engagement.

9. A non-transitory computer readable storage medium storing instructions, the instructions when executed by a processor cause the processor to:
    determine embedding vectors for a plurality of entities of a social networking system, the entities of the social networking system providing content for consumption by users of the social networking system, the embedding vectors representing the entities of the social networking system in a latent space and determined based on entity co-engagement by a set of users interacting with the plurality of entities, wherein a level of co-engagement of two or more entities is proportional to a number of users that engaged with the two or more entities in the past;

determine a user vector for a target user of the social networking system, the user vector based on a weighted sum of embedding vectors of entities the target user interacted with in the past;

for each entity of a set of entities of the social networking system, determine a measure of similarity between the user vector and an embedding vector of the entity;

rank the set of entities based on the determined measure of similarity; and select a top threshold number of entities to be presented to the target user based on the ranking.

10. The non-transitory computer readable storage medium of claim 9, wherein the measure of similarity is a cosine similarity score between the user vector and the embedding vectors.

11. The non-transitory computer readable storage medium of claim 9, wherein determining a measure of similarity between the user vector and an embedding vector of the entity comprises:

determining a measure of similarity between the user vector and embedding vectors that are in a same orthant as the user vector.

12. The non-transitory computer readable storage medium of claim 9, wherein the measure of similarity between the user vector and an embedding vector of an entity is performed responsive to determining that the embedding vector of the entity is within a threshold Euclidean distance value of the user vector.

13. The non-transitory computer readable storage medium of claim 9, wherein the instructions further cause the processor to:

identify one or more entities to be presented to the user based on a measure of similarity between an embedding vector of an entity the target user has previously interacted with and embedding vectors of the entities of the set of entities of the social networking system.

14. The non-transitory computer readable storage medium of claim 9, wherein the instructions further cause the processor to responsive to the user interacting with a first entity:

determine an embedding vector for the first entity;

for each entity of the set of entities of the social networking system, determine a measure of similarity between the embedding vector of the first entity and an embedding vector of the entity;

rank the set of entities based on the determined measure of similarity; and select one or two entities to be presented to the target user based on the ranking.

15. The non-transitory computer readable storage medium of claim 9, wherein training the model based on entity co-engagement comprises:

training the model so that a distance between embedding vectors for two entities of the social networking system is based on a level of co-engagement of the two entities.

16. The non-transitory computer readable storage medium of claim 9, wherein the instructions further cause the processor to:

determine a level of engagement for each of the set of entities, the level of engagement directly proportional to an amount of engagement for an entity of the set of entities, and indirectly proportional to a number of users the entity was presented to; and filter the set of entities based on the determined level of engagement.

17. A system comprising:

a processor; and non-transitory computer readable storage medium storing instructions, the instructions when executed by the processor cause the processor to:

determine embedding vectors for a plurality of entities of a social networking system, the entities of the social networking system providing content for consumption by users of the social networking system, the embedding vectors representing the entities of the social networking system in a latent space and determined based on entity co-engagement by a set of users interacting with the plurality of entities, wherein a level of co-engagement of two or more entities is proportional to a number of users that engaged with the two or more entities in the past;

determine a user vector for a target user of the social networking system, the user vector based on a weighted sum of embedding vectors of entities the target user interacted with in the past;

for each entity of a set of entities of the social networking system, determine a measure of similarity between the user vector and an embedding vector of the entity;

rank the set of entities based on the determined measure of similarity; and select a top threshold number of entities to be presented to the target user based on the ranking.

18. The system of claim 17, wherein the measure of similarity is a cosine similarity score between the user vector and the embedding vectors.

19. The system of claim 17, wherein the instructions further cause the processor to:

identify one or more entities to be presented to the user based on a measure of similarity between an embedding vector of an entity the target user has previously interacted with and embedding vectors of the entities of the set of entities of the social networking system.

20. The system of claim 17, wherein training the model based on entity co-engagement comprises:

training the model so that a distance between embedding vectors for two entities of the social networking system is based on a level of co-engagement of the two entities.

* * * * *